3,278,600
α-AMINE-p-METHOXYISOBUTYROPHENONE
AND SALTS THEREOF
Yvon J. L'Italien, Plymouth, Mich., assignor to Parke,
Davis & Company, Detroit, Mich., a corporation of
Michigan
No Drawing. Filed Aug. 30, 1963, Ser. No. 305,852
3 Claims. (Cl. 260—570.5)

The present invention relates to α-amino-p-methoxyisobutyrophenone of the formula

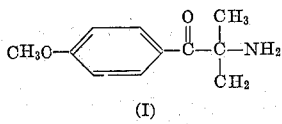

to non-toxic acid-addition salts thereof, and to methods for their production.

In accordance with the invention, α-amino-p-methoxyisobutyrophenone and acid-addition salts thereof are produced by the reaction of p-methoxyisobutyrophenone, dimethylhydrazone, methiodide, having the formula

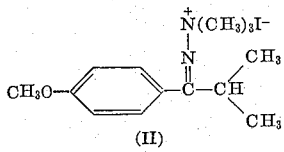

with an alkali metal alkoxide, followed by reaction of the intermediate 2,2-dimethyl-3-lower alkoxy-3-(p-methoxyphenyl)-aziridine, having the formula

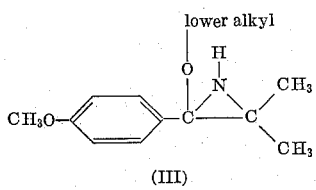

with a mineral acid. The lower alkyl group appearing in Formula III is one containing not more than four carbon atoms, and is preferably isopropyl. The first stage of this process is carried out in a solvent that is preferably a lower alkanol, such as methanol, ethanol, or isopropanol. Suitable alkali metal alkoxides that may be used are sodium methoxide, sodium ethoxide, or sodium isopropoxide. Equivalent quantities of reactants may be used; it is preferable, however, to employ an excess of the alkali metal methoxide. The temperature and duration of this first stage are not critical, and may be varied over a range from 50° C. to 120° C. over a period of 2 to 24 hours. It is most convenient to carry out this initial stage at the reflux temperature of the solvent employed for a period of 2 to 6 hours. The product of this first stage, 2,2-dimethyl-3-lower alkoxy-3-(p-methoxyphenyl)-aziridine of Formula III, may be isolated by evaporating the solvent, diluting with water, extracting the aqueous mixture with ether, evaporating the ether solution to dryness and distilling the liquid product. The isolated aziridine product can then be reacted with an excess of mineral acid, such as hydrochloric acid or sulfuric acid, to prepare the desired α-amino-p-methoxyisobutyrophenone as the corresponding acid-addition salt. Alternatively, the product mixture of the first stage described above, containing the aziridine intermediate, can be treated directly with an excess of mineral acid to prepare the compound of the invention as the corresponding acid-addition salt. The free base can then be obtained by neutralization of a solution of the acid-addition salt with a suitable base, such as sodium hydroxide, extraction with ether, and evaporation of the ether solution to dryness.

The p-methoxyisobutyrophenone, dimethylhydrazone, methiodide used as starting material in the foregoing process can be prepared by reacting p-methoxyisobutyrophenone with unsymmetrical dimethylhydrazine under reflux in glacial acetic acid followed by reaction of the product obtained with an excess of methyl iodide in the cold.

Also in accordance with the invention, α-amino-p-methoxyisobutyrophenone and acid-addition salts thereof are produced by the hydrolysis of α-phthalimido-p-methoxyisobutyrophenone, having the formula

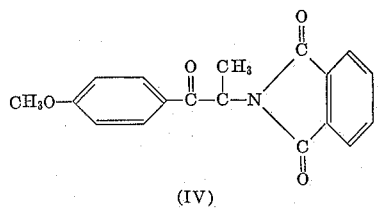

with a base or a mineral acid. Preferred hydrolysis agents are the bases, sodium hydroxide and potassium hydroxide, and the mineral acids, hydrochloric acid and sulfuric acid. Hydrobromic acid and hydriodic acid should not be used as hydrolysis agents, since their use may result in cleavage of the methoxy group. The hydrolysis is preferably carried out in water; aqueous mixtures of water-miscible solvents, such as lower alkanols, dimethylformamide, tetrahydrofuran and the like can also be used, however. The temperature and duration of the hydrolysis reaction may be varied over a wide range from 50° C. to 150° C. over a period of one to 40 hours. It is most convenient to carry out the hydrolysis at 90–100° C. for a period of 3 hours. For best yields, an excess of the hydrolysis agent is employed. If an acidic hydrolysis agent is used, the product obtained is an acid-addition salt of α-amino-p-methoxyisobutyrophenone. The free base is then obtained by neutralization of a solution of the acid-addition salt with a suitable base, extraction of the neutral solution with ether, and evaporation of the ether solution to dryness.

The α-phthalimido-p-methoxyisobutyrophenone used as starting material in the foregoing process can be prepared by the reaction of α-phthalimidoisobutyric acid with anisole in the presence of trifluoroacetic anhydride.

The free base compound of the invention, α-amino-p-methoxyisobutyrophenone, forms non-toxic acid-addition salts by reaction with a variety of inorganic and organic acids. Non-toxic acid-addition salts are formed by reaction of the free base with acids such as hydrochloric, sulfuric, nitric, acetic, citric, tartaric, sulfamic, and the like.

The compounds of the invention are of value as pharmacological agents. They exhibit an appetite-depressant effect, and hence are useful in weight control. They are also anti-arrhythmia agents of value in controlling abnormal heart rhythm. In such applications, they are essentially devoid of central nervous system stimulant effects and of hypotensive effects. The compounds of the invention may be administered orally or parenterally.

The invention is illustrated by the following examples:

*Example 1*

A solution of sodium isopropoxide in isopropanol is prepared by dissolving 21 g. of sodium in 2 liters of isopropanol. This solution is added to a solution of 26.5 g. p-methoxyisobutyrophenone, dimethyldrazone, methiodide in 250 ml. of isopropanol at the reflux temperature, and the mixture is heated under reflux for 3 hours more. The cooled mixture is filtered, and the solvent is evaporated from the filtrate under reduced pressure. The residue obtained is 2,2-dimethyl-3-isopropoxy-3-(p-methoxyphenyl)-aziridine, which may be isolated by diluting with water, extracting the aqueous mixture with ether, drying the ether solution over anhydrous potassium carbonate, evaporating the dried solution to dryness, and distilling the liquid residue under reduced pressure; B.P. 145°–148° C./11 mm. Hg.

2,2-dimethyl-3-isopropoxy - 3 - (p - methoxyphenyl)-aziridine (128 g.; prepared as described above) is added dropwise with stirring over a period of about 30 minutes to a solution of 85 ml. of concentrated hydrochloric acid in 500 ml. of water maintained at 25°–30° C., and the mixture is stirred at room temperature for one hour more. After extraction with ether, the aqueous phase is separated, and evaporated to near dryness under reduced pressure. The last traces of water are removed by adding a small amount of isopropanol, and again evaporating to dryness. The hydrochloride salt of α-amino-p-methoxyisobutyrophenone obtained is crystallized from a mixture of isopropanol and methanol; M.P. 220°–221° C.

The free base, α-amino-p-methoxyisobutyrophenone, is obtained by dissolving the hydrochloride salt in water, neutralizing the aqueous solution with sodium hydroxide, extracting the neutral solution with ether, drying the ether solution over anhydrous potassium carbonate, evaporating the solvent from the dried solution under reduced pressure, and distilling the liquid product under reduced pressure.

The p-methoxyisobutyrophenone, dimethylhydrazone, methiodide, used as starting material in the foregoing procedure, is prepared by the following procedure. A mixture of 225 g. of p-methoxyisobutyrophenone, 280 ml. of unsymmetrical dimethylhydrazine, and 42 ml. of glacial acetic acid is heated under reflux for 3 days. The mixture is cooled, diluted with 750 ml. of ether, and the ethereal solution is washed successively with water, 20% aqueous sodium hydroxide solution, and water again. After drying over anhydrous potassium carbonate, the ether solution is evaporated to dryness, and the residue of p-methoxyisobutyrophenone, dimethylhydrazone is distilled under reduced pressure; B.P. 143–144° C./13 mm. Hg. This product (220.3 g.) is dissolved in 300 ml. of acetonitrile, 200 g. of methyl iodide is carefully added, and the mixture is heated on a steam bath at 70° C. for 30 minutes. After cooling, the mixture is diluted with one liter of ether, and the crystalline p-methoxyisobutyrophenone, dimethylhydrazone, methiodide obtained is isolated, washed with ether, and dried; M.P. 121–123° C.

*Example 2*

A mixture of 77 g. of α-phthalimidoisobutyric acid and 100 ml. of anisole is stirred while 70 g. of trifluoroacetic anhydride is carefully added. The resulting solution is heated at 100° C. for 20 hours, cooled, poured into ice, and the aqueous mixture is made basic with 20% aqueous sodium hydroxide solution. The basic mixture is diluted with benzene, and the organic phase is washed repeatedly with water until neutral to litmus. The organic phase is then separated, dried over anhydrous potassium carbonate, treated with charcoal, and evaporated to dryness. The solid α-phthalimido-p-methoxyisobutyrophenone obtained is crystallized from benzene-petroleum ether; M.P. 133°–134° C.

A mixture of 30 g. of α-phthalimido-p-methoxyisobutyrophenone in 180 ml. of 10% aqueous potassium hydroxide is heated on a steam-bath until solution is complete. The solution is then treated with charcoal, filtered, and the filtrate is diluted with water to a volume of 1200 ml. The aqueous solution is made slightly acidic with concentrated hydrochloric acid, and the precipitated solid is isolated, washed with water, and heated under reflux for 3 hours with 300 ml. of 10% hydrochloric acid. The acid solution is filtered, the filtrate is evaporated to dryness, and the solid hydrochloride salt of α-amino-p-methoxyisobutyrophenone obtained is crystallized from isopropanol; M.P. 220°–221° C.

The free base, α-amino-p-methoxyisobutyrophenone, is obtained by making an aqueous solution of the hydrochloride basic with sodium hydroxide and extracting with ether.

A water-soluble citrate of α-amino-p-methoxyisobutyrophenone is obtained by mixing methanolic solutions of the free base and citric acid, concentrating the mixture to a small volume, and isolating the precipitated salt by filtration.

*Example 3*

A mixture of 30 g. of α-phthalimido-p-methoxyisobutyrophenone, 250 ml. of 20% hydrochloric acid, and 10 ml. of glacial acetic acid is heated with stirring on a steam bath for about 20 hours. The mixture is cooled, filtered, and the filtrate is evaporated to near-dryness. The residue is made strongly basic with aqueous sodium hydroxide solution, and the basic mixture is extracted with ether. After drying over anhydrous potassium carbonate, the ether solution is treated with an isopropanolic solution of hydrogen chloride to precipitate the hydrochloride salt of α-amino-p-methoxyisobutyrophenone.

I claim:
1. A member of the class consisting of α-amino-p-methoxyisobutyrophenone of the formula

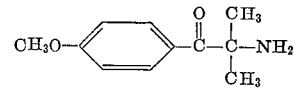

and non-toxic acid-addition salts thereof.
2. α-Amino-p-methoxyisobutyrophenone.
3. α-Amino-p-methoxyisobutyrophenone hydrochloride.

References Cited by the Examiner
UNITED STATES PATENTS

| | | | |
|---|---|---|---|
| 2,997,472 | 8/1961 | Janssen | 260—570.5 |
| 3,074,960 | 1/1963 | Archer | 260—326 |
| 3,082,255 | 3/1963 | Stevens et al. | 260—570.5 |

OTHER REFERENCES

Campbell et al.: "Jour. Organic Chem.," vol. 8, pages 103–9 (1943).

Curtin et al.: "Journal American Chemical Society," vol. 77, pages 354–7 (1955) (page 356 relied on).

Noller: "Chemistry of Organic Compounds," 2nd ed., page 553 (1957).

Steinberg et al.: "Jour. Organic Chem.," vol. 13, pages 413–20 (1948).

CHARLES B. PARKER, *Primary Examiner.*

ROBERT V. HINES, *Assistant Examiner.*